United States Patent Office
3,769,374
Patented Oct. 30, 1973

3,769,374
BICYCLOALKYL PHOSPHATES
Peter E. Newallis, Leawood, Kans., and Zafarullah K. Cheema, Morristown, N.J., assignors to Allied Chemical Corporation, New York, N.Y.
No Drawing. Original application Apr. 24, 1969, Ser. No. 819,536, now Patent No. 3,636,204. Divided and this application June 8, 1971, Ser. No. 150,934
Int. Cl. C07f 9/08, 9/16; A01n 9/36
U.S. Cl. 260—943      7 Claims

ABSTRACT OF THE DISCLOSURE

S-(N-bicycloalkylcarboxamido) esters of phosphoro(di)thioic acid, phosphono(di)thioic acid, and phosphino(di)thioic acid are prepared by condensing a salt of the acid with chlorinated N-bicycloalkylcarboxamide. The compounds are useful as insecticides.

This is a division of application Ser. No. 819,536, filed Apr. 24, 1969, now U.S. Pat. 3,636,204.

BACKGROUND OF THE INVENTION

This application relates to novel organic compounds, and in particular to novel bicycloalkyl phosphorus compounds useful as insecticides.

The need to control undesirable insect populations has made it necessary to seek new agents which are useful insecticides. Requirements for useful insecticides will vary depending upon the type of application intended, but any successful agent must, of course, be toxic to the insect to be controlled. For some application, it is desirable that the insecticide be stable and have extended residual activities; for other applications, it is preferred that its useful life be short. When the insecticide is to be used by unskilled personnel, it should be relatively non-toxic to mammals, while in other cases, particularly where it is to be applied only by skilled personnel, mammalian toxicity is less critical. Also, where the insecticide is to be applied to the foliage or roots of plants or to the soil in which the plant is growing, it must be non-phytotoxic, at least at the insecticidal dosage.

SUMMARY OF THE INVENTION

The novel compounds of the instant invention are those of the formula

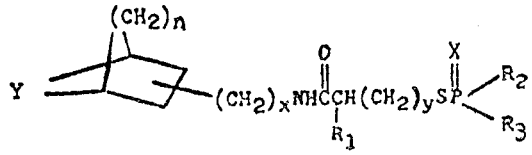

wherein $n$ is an integer from 1 to 3; $x$ is an integer from 0 to 3; $y$ is an integer from 0 to 2; $R_1$ is hydrogen or alkyl containing up to about 3 carbon atoms; $R_2$ and $R_3$ are each alkyl or alkoxyl containing up to about 6 carbon atoms; X is oxygen or sulfur; and Y is —CH$_2$CH$_2$— or —CH=CH—.

These bicycloalkyl phosphorus compounds are useful as insecticidal agents.

Detailed description of the invention

The instant compounds may be prepared by condensation of an appropriately chlorinated N-bicycloalkylcarboxamide and a salt of an appropriate phosphorus acid according to the following reaction:

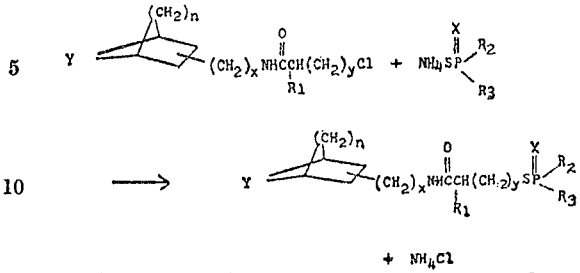

$+ NH_4Cl$ wherein $n$, $x$, $y$, X, Y, $R_1$, $R_2$ and $R_3$ are as aforesaid. Among the salts of the phosphorus acid which may be used are the ammonium, sodium and potassium salts, and the like. The ammonium salt is preferred because of its solubility.

The reaction may be conducted by admixing equimolar amounts of the two reagents in an appropriate solvent, but an excess of the acid is normally preferred to improve the yield with respect to the bicycloalkyl substrate. Any reaction-inert solvent may be used, including acetone, methylene chloride, dioxane and the like. The acid reagent, preferably in solution, will usually be added to a solution of the bicycloalkyl compound. It is not necessary that the same solvent be used in preparing the two initial solutions, so long as the solvents used are miscible.

Ambient temperatures will normally be sufficient to achieve formation of the product, for example 20–30° C. However, higher temperatures may be used if desired to accelerate the rate of the reaction, which will usually be complete within about 24 hours.

The product may be recovered and purified by a variety of methods familiar to those skilled in the art, for example by solvent removal, crystallization, chromatography, etc. Most conveniently, the solvent is removed under reduced pressure after filtering the reaction mixture to remove precipitated solids. The residue can then be dissolved in methylene chloride or similar solvent, washed, dried and then distilled to dryness.

The product is capable of geometrical isomerism about the bicycloalkyl moiety, with the two possible configurations commonly referred as "endo" and "exo." This isomerism is illustrated by the following norbonyl compounds:

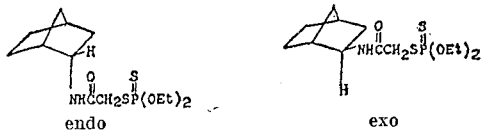

endo         exo

The configuration of a particular product will be determined by the configuration of the substrate, i.e., endo substrate will result in endo product and exo substrate will result in exo product.

The bicycloalkyl substrates, both endo and exo, are prepared by methods known in the art, for example, U.S. Patents. 2,912,459 and 2,926,172, and J. Med. and Pharm. Chem., 4, 183 (1961).

The instant compounds have been unexpectedly found to be effective insecticides, thereby rendering them useful agents for the control of insects such as flies, beetles, roaches, cattle grubs, aphids, etc., and other pests such as spiders, mites and ticks. When used for this purpose, they can be used in compositions wherein they are the sole active ingredient or in combination with other control agents, including insecticides, acaricides, and fungicides.

The instant compounds may be used alone, but will preferably be used in conjunction with a carrier or diluent in an insecticidal composition. Various diluents may be employed and the percentage of active ingredient will form a proportion of the composition such that a suitable dosage level will be obtained. For marketing purposes, pure active agent or compositions thereof containing up to about 95% of active agent are provided. However, for insecticidal applications the concentrated formulation is appropriately diluted. Compositions having as low as $10^{-6}$% by weight of active ingredient are effective. Of course, depending upon factors such as method of administration, climatic conditions, concentration of insect population, and other characteristics of the species to be controlled, very low levels may not be sufficiently effective, in which event the level may be gradually increased in an obvious manner until a toxic level is provided. For certain purposes, it may be desirable to employ relatively high levels of active agent, for example, about 5% by weight.

The particular carrier selected and the proportion of active ingredient to carrier are influenced by the solubility and chemical nature of the particular compound being used and the chosen method of use. Solvents such as benzene, toluene, xylene, chlorinated aliphatic and aromatic hydrocarbons (methylene chloride, chlorobenzene, etc.) may be used when it is desired to use the instant agent in liquid form. Also, the compound can be used in suspensions, in which case carriers such as kaolins, silicas and talc might be employed. When the compound is to be used in solid form, it can be dispersed in materials such as corn cobs and clays.

Methods for using the agent include spraying solutions or suspensions, dusting with a powder, and admixing the agent in any form with food.

When a feed-bait is employed as the method of administration, the carrier must be a substance to which the insect is attracted. Any substance may be employed provided its properties present a desirable substance which the insect consumes. The feed-bait may comprise nonfat dry milk, granulated sugar, powdered eggs, malt, molasses, yeast, or other feeding sources or combinations thereof having incorporated into such feed-bait the insecticide. The physical form of such feed is not critical and may be introduced into the insect environment in solution or solid form. In the case of a feed-bait solution, an aqueous solution may be introduced into the environment by conventional means such as spraying or in solid form such as a dust or granulated substance. The solution feed method should comprise an alluring substance, although not necessarily of nutritious value. The solid feed-bait procedure utilizes an alluring substance which is coated or impregnated with the insecticide. Such a solid feed-bait carrier may readily be prepared by dissolving the solid feed in a solution comprised of the insecticide and a suitable solvent followed by slight agitation. The solvent is removed by distillation or evaporation and impregnated feed-carrier isolated. For application as a dust or as granules, the treated feed-bait is pulverized by conventional means.

While all the instant compounds have insecticidal activity, preferred compounds are the saturated compounds wherein Y is —$CH_2CH_2$—, particularly those wherein $n$ is 1. Specific agents which are preferred are O,O-diethyl - S - {α - [N - (endo - 2 - norbornyl)] - acetamidyl}-phosphorothioate ($n$ is 1, $x$ and $y$ are 0, Y is —$CH_2CH_2$—, $R_1$ is hydrogen, X is oxygen and $R_2$ and $R_3$ are each ethoxy); methyl O-ethyl-S-{α-[N-(endo-2-norbornyl)]acetamidyl} - phosphonodithioate ($n$ is 1, $x$ and $y$ are 0, Y is —$CH_2CH_2$—, $R_1$ is hydrogen, X is sulfur, $R_2$ is methyl and $R_3$ is ethoxy); and O,O-diethyl-S - {α-[N-(endo-2-norbornylmethyl)]acetamidyl} - phosphorothioate ($n$ is 1, $x$ is 1, $y$ is 0, Y is —$CH_2CH_2$—, $R_1$ is hydrogen, X is oxygen and $R_2$ and $R_3$ are each ethoxy).

The following examples are provided to more fully illustrate the instant invention. They are provided for illustrative purposes only and are not to be construed as limiting the instant invention, which is defined by the appended claims.

EXAMPLE I

O,O-diethyl-S-{α-[N-(endo - 2 - norbornyl)]acetamidyl}phosphorodithioate ($n=1$, $x$ and $y=0$, Y=—$CH_2CH_2$—, $R_2$=H, X=S, $R_2$ and $R_3$=OEt)

To a solution of ammonium O,O-diethylphosphorodithioate (3.5 g., 0.017 mole) in 100 ml. of acetone was added a solution of N-(endo-2-norbornyl)-α-chloroacetamide (1.9 g., 0.001 mole) in 50 ml. of acetone. The reaction mixed was stirred for two hours at 25–30° C., and then was filtered to remove precipitated solids. The volatiles were then removed under reduced pressure, leaving a residue which was dissolved in methylene chloride, washed with water and dried. The methylene chloride was removed by distillation leaving the desired product as an amber oil, 3.2 g. (98%).

*Analysis.*—Calc'd for $C_{13}H_{24}O_3PS_2$ (percent): C, 46.3; H, 7.15; N, 4.15; P, 8.95. Found (percent): C, 45.8; H, 7.6; N, 4.3; P, 8.15.

EXAMPLE II

The procedure of Example I was repeated wherein equivalent amounts of appropriate bicycloalkylcarboxamides were used in place of said N-(endo-2-norbornyl)-α-chloroacetamide to afford the following products:

Product

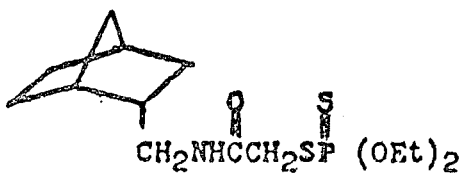

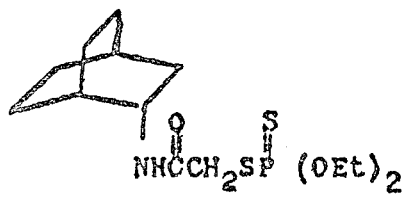

EXAMPLE III

The procedure of Example I is repeated wherein appropriate bicycloalkylcarboxamides and phosphorodithioates are used in place of the substrates of Example I to afford the following products:

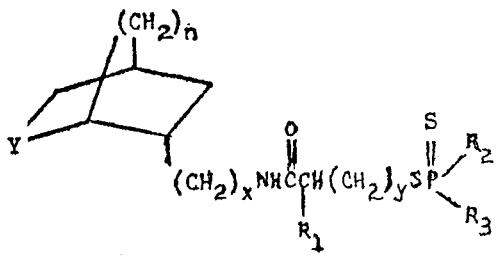

| n | x | y | Y | $R_1$ | $R_2$ | $R_3$ |
|---|---|---|---|---|---|---|
| 1 | 3 | 0 | —CH$_2$CH$_2$— | CH$_3$ | OCH$_3$ | OCH$_3$ |
| 1 | 3 | 2 | —CH$_2$CH$_2$— | H | OiC$_3$H$_7$ | O—n-C$_4$H$_9$ |
| 2 | 2 | 2 | —CH=CH— | i-C$_3$H$_7$ | O—n-C$_6$H$_{13}$ | O—n-C$_6$H$_{13}$ |
| 1 | 1 | 1 | —CH$_2$CH$_2$— | OC$_2$H$_5$ | OC$_2$H$_5$ | OC$_2$H$_5$ |
| 3 | 1 | 0 | —CH=CH— | H | OC$_2$H$_5$ | OC$_2$H$_5$ |

EXAMPLE IV

O,O-diethyl-S-{α-[N-(endo - 2 - norbornyl)]acetamidyl}phosphorothioate ($n=1$, $x$ and $y=0$, $$Y=-CH_2CH_2-,$$

$R_1=H$, $x=0$, $R_2$ and $R_3=OEt$)

The procedure of Example I was repeated wherein an equivalent amount of ammonium O,O-diethyl phosphorothioate was used in place of said dithioate to afford the desired product.

EXAMPLE V

The procedure of Example IV was repeated using an equivalent amount of appropriate bicycloalkylcarboxamide in place of the N-(endo-2-norbornyl)-α-chloroacetamide to afford the following products:

Product

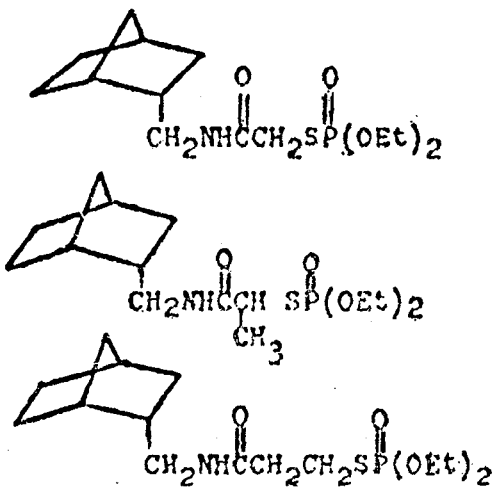

EXAMPLE VI

Methyl O-ethyl-S-{α-[N-(endo-2-norbornyl)] acetamidyl} phosphonodithioate ($n=1$, $x$ and $y=0$, $R_1=H$, $X=S$, $R_2=CH^3$, $R_3=OEt$)

The procedure of Example I was repeated wherein an equivalent amount of ammonium metyl-O-ethylphosphonodithioate was used in place of said phosphorodithioate to afford the desired product as an amber oil.

EXAMPLE VII

Dimethyl S-{α-[N-(endo-2-norbornyl)] acetamidyl} phosphinodithioate ($n=1$, $x$ and $y=0$, $Y=-CH_2CH_2-$, $R_1=H$, $X=S$, $R_2$ and $R_3=CH_3$ The procedure of Example I was repeated wherein an equivalent amount of ammonium dimethyl phosphinodithioate was used in place of said phosphorodithioate to afford the desired product as an amber oil.

EXAMPLE VIII

Insecticidal activity

The following standardized tests were conducted to determine the effectiveness of the instant compounds as insecticides against adult house flies (HFA), two-spotted spider mites (TSSM), Mexican bean beetle larvae (MBBL), pea aphid adults (PAA), and southern armyworm larvae (SAL).

TEST 1

Non-systemic primary test for Mexican bean beetle larvae (MBBL)

A solution consisting of 4.8 gm. of active ingredient was mixed in 100 cc. of acetone. The solution was diluted with water so that the concentration of active ingredient was 1 oz./100 gal.

Horticultural (cranberry) bean plants, in 2½ inch pots with all foliage removed except one primary leaf, were sprayed with the solution for 2 seconds on the upper surface and 5 seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 3rd instar larvae were then confined on each plant with 6 inch screen wire spheres. Mortality and feeding records were made 3 days after treatment.

TEST 2

Non-systemic test for pea aphid adults (PAA)

A solution consisting of 4.8 grams of active ingredient was mixed in 100 cc. of acetone. The solution was diluted with water so that the concentration of active ingredient was 1 oz./100 gal.

English broad bean plants were sprayed for 2 seconds on upper surface and 5 seconds on under surface with this solution. Adult female aphids (10 per test) were brushed from infested broad bean plants into 5 inch screen wire hemispheres and sprayed for 5 seconds (approx. 0.6 cc. delivery per second from nozzle). Spray was applied from a DeVilbiss atomizer nozzle at 20 p.s.i., with the aphids 15 inches from the nozzle. Following treatment, aphids were caged over previously sprayed plants and mortality records were usually made 3 days later.

TEST 3

Non-systemic primary test for southern armyworn larvae (SAL)

A solution consisting of 4.8 gms. of active ingredient was mixed in 100 cc. of acetone. The solution was diluted with water so that the concentration of active ingredient was 4 oz./100 gal.

Horticultural (cranberry) bean plants, in 2½ inch pots with all foliage removed except one primary leaf, were sprayed with the solution for 2 seconds on the upper surface and 5 seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 4th and 5th instar larvae were then confined on each plant with 6 inch screen wire spheres. Mortality and feeding records were made 3 days after treatment.

TEST 4

Non-systemic primary test for two-spotted spider mites (TSSM)

A solution was prepared of 4.8 gm. of active ingredient in 100 cc. of acetone. The solution was diluted with water to a concentration of 8 oz./100 gal. of active ingredient.

Young horticultural (cranberry) bean plants in 2½ inch pots were infested with mites (all stages) one day before treatment. In treating plants the upper surface was sprayed with the solution for two seconds and the lower or under surface was sprayed for 5 seconds. The spray was delivered from a DeVilbiss atomizer nozzle operated at 20 p.s.i. with the plant about 18" from nozzle. The approximate volume of spray on the upper surface was 0.13 cc. and on the lower surface was 0.32 cc. Following the treatment, the potted plants were placed in irrigated trays in the greenhouse and initial kills of adults were recorded three days later. Residual and ovicidal observations were made 7–8 days after treatment, which allowed ample time for the eggs to hatch under greenhouse conditions. One leaf from each plant was used to make 3-day counts, and the remaining leaf on each plant was used to determine residual and ovicidal activity.

TEST 5

Nonsystemic primary test for house fly adults (HFA)

Dry food (6 parts powdered non-fat dry milk, 6 parts granulated sugar and 1 part powdered egg) was mixed with an acetone solution of active ingredient so that the food contained 0.125% of the compound. The mixture was allowed to dry and then repulverized. Wettable powders were mixed with the dry food with the aid of mortar and pestle. The treated food was placed in emergency cages containing 50 fly purpae. Cages containing untreated food were used as checks. Examination of each cage was made periodically for 9 days to determine emergence, condition of flies, and acute toxicity.

TEST 6

Systemic primary test for Mexican bean beetle larvae (MBBL)

A standard acetone solution contining 4.8 grams of active ingredient per 100 cc. of acetone was diluted with plants (young English broad bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were meade 3 days later.

TEST 8

Systemic primary test for two-spotted spider mites (TSSM)

A standard acetone solution containing 4.8 grams of active ingredient per 100 cc. of acetone was diluted with water at 4 oz./100 gals. of $H_2O$. After dilution, 100 cc. of the solution were placed in glass jars, along with the test plants (young horticultural (cranberry) bean plants) whose roots had been washed free of soil. The roots of the solution were placed in glass pars, along with the test container. Aluminum foil was fitted over the top of the container and around the stem of the plant to lessen possible fumigant effects of the compounds tested. The insects were placed on the plants within 24 hours after treatment and the mortality records were made 3 days later. The ovicidal and residual data was recorded 8 days after the treatment.

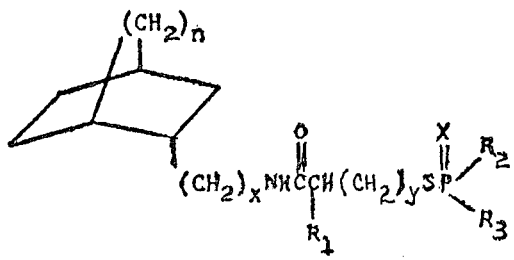

|  | Compound | | | | | | Non-systemic primary tests—(percent mortality) | | | | |
|---|---|---|---|---|---|---|---|---|---|---|---|
| n | x | y | $R_1$ | X | $R_2$ | $R_3$ | Test 1, MBL | Test 2, PAA | Test 3, SAL | Test 4, TSSM | Test 5, HFA |
| 1 | 0 | 0 | H | S | OEt | OEt | 0 | 90 | 0 | 100 | 98 |
| 1 | 0 | 0 | H | S | $CH^3$ | OEt | 100 | 100 | 0 | 100 | 100 |
| 1 | 1 | 0 | $CH_3$ | O | OEt | OEt | 0 | 10 | 10 | 100 | |
| 2 | 0 | 0 | H | S | OEt | OEt | 0 | 0 | 0 | 98 | 100 |

| | | | | | | | Systemic primary tests—(percent mortality) | | |
|---|---|---|---|---|---|---|---|---|---|
| | | | | | | | Test 6, MBBL | Test 7, PAA | Test 8, TSSM |
| 1 | 0 | 0 | H | S | OEt | OEt | 0 | 100 | 19 |
| 1 | 0 | 0 | H | S | $CH_3$ | OEt | 100 | 100 | 100 |
| 1 | 1 | 0 | H | S | OEt | OEt | 0 | 100 | 7 |
| 1 | 1 | 0 | H | O | OEt | OEt | 60 | 100 | 14 |
| 1 | 1 | 1 | H | O | OEt | OEr | 0 | 100 | 0 |
| 1 | 0 | 0 | H | O | OEt | OEt | 100 | 100 | 100 |
| 2 | 0 | 0 | H | S | OEt | OEt | 0 | 100 | 12 | water to 4 oz./100 gals. of $H_2O$. After dilution, 100 cc. of the solution were placed in glass jars, along with the test plants (young horticultural (cranberry) bean plants) whose roots had been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST 7

Systemic primary test for pea aphid adults (PAA)

A standard acetone solution containing 4.8 grams of active ingredient per 100 cc. of acetone was diluted with water to 4 oz./100 gals. $H_2O$. After dilution, 100 cc. of the solution were placed in glass jars, along with the test The illustration of the compounds that constitute the invention given above are not intended to limit the invention in any way but are merely descriptive. All modifications which fall within the spirit of the present invention are claimed as part of the present invention.

What is claimed is:

1. A compound of the formula

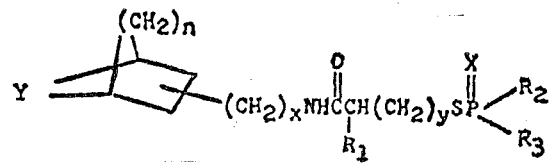

wherein $n$ is an integer from 1 to 3; $x$ is an integer from 0 to 3; $y$ is an integer from 0 to 2; $R_1$ is hydrogen or alkyl containing up to 3 carbon atoms; $R_2$ and $R_3$ are each alkyl or alkoxyl containing up to 6 carbon atoms; X is oxygen or sulfur; and Y is —$CH_2CH_2$— or —CH=CH—.

2. The compound of claim 1 wherein Y is

—$CH_2CH_2O$.

3. The compound of claim 2 wherein $n$ is 1.
4. The compound of claim 2 wherein $R_1$ is hydrogen and $y$ is 0.
5. The compound of claim 4 wherein $x$ is 0, X is oxygen, and $R_2$ and $R_3$ are each ethoxy.
6. The compound of claim 4 wherein $x$ is 0, X is sulful, $R_2$ is methyl, and $R_3$ is ethoxy.
7. The compound of claim 4 wherein $x$ is 1, X is oxygen, and $R_2$ and $R_3$ are each ethoxy.

References Cited

UNITED STATES PATENTS 3,134,801    5/1964    Sehring et al. _____ 260—943

ANTON H. SUTTO, Primary Examiner

U.S. Cl. X.R.

260—979; 424—211

PO-1050
(5/69)

UNITED STATES PATENT OFFICE
CERTIFICATE OF CORRECTION

Patent No. 3,769,374      Dated October 30, 1973

Inventor(s) Peter E. Newallis and Zafarullah K. Cheema

It is certified that error appears in the above-identified patent and that said Letters Patent are hereby corrected as shown below:

Column 4, line 15, "$R_2=H$" should be --$R_1=H$--.

Column 5, line 65, "metyl" should be --methyl--.

Column 7, line 28, "purpae" should be --pupae--.

Column 8, line 8, "meade" should be --made--.

Column 8, line 19, delete "the solution were placed in glass pars, along with the test" and insert therefore --the test plants were in contact with the bottom of the--.

Column 9, line 4, formula "$-CH_2CH_2O$" should read -- $-CH_2CH_2-$ --.

Column 9, lines 10 and 11, "sul-ful" should read --sulfur--.

Signed and sealed this 2nd day of April 1974.

(SEAL)
Attest:

EDWARD M. FLETCHER, JR.      C. MARSHALL DANN
Attesting Officer      Commissioner of Patents